United States Patent
Kimura

(10) Patent No.: US 9,217,348 B2
(45) Date of Patent: Dec. 22, 2015

(54) EXHAUST GAS PURIFICATION DEVICE

(71) Applicant: Hino Motors, Ltd., Hino (JP)

(72) Inventor: Masahiro Kimura, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 0 days.

(21) Appl. No.: 14/363,020

(22) PCT Filed: Oct. 11, 2012

(86) PCT No.: PCT/JP2012/076306
§ 371 (c)(1),
(2) Date: Jun. 5, 2014

(87) PCT Pub. No.: WO2013/099404
PCT Pub. Date: Jul. 4, 2013

(65) Prior Publication Data
US 2014/0325967 A1 Nov. 6, 2014

(30) Foreign Application Priority Data
Dec. 28, 2011 (JP) ................. 2011-288818

(51) Int. Cl.
*F01N 3/00* (2006.01)
*F01N 3/20* (2006.01)
(Continued)

(52) U.S. Cl.
CPC .............. *F01N 3/20* (2013.01); *B01F 3/04049* (2013.01); *B01F 5/0065* (2013.01); *B01F 5/0471* (2013.01); *F01N 3/2066* (2013.01); *F01N 3/2892* (2013.01); *F01N 3/021* (2013.01); *F01N 3/103* (2013.01); *F01N 13/009* (2014.06); *F01N 13/0097* (2014.06); *F01N 2240/20* (2013.01);

(Continued)

(58) Field of Classification Search
CPC ........... F01N 13/02; F01N 13/10; F01N 1/66; F01N 3/035; F01N 3/0842; F01N 2240/20; F02D 41/029
USPC ............................................. 60/295, 301, 324
See application file for complete search history.

(56) References Cited

U.S. PATENT DOCUMENTS 5,916,134 A * 6/1999 Yang et al. ...................... 60/299
6,449,947 B1 * 9/2002 Liu et al. ......................... 60/286
(Continued)

FOREIGN PATENT DOCUMENTS

CN 1058451 A 2/1992
EP 0 555 746 A1 8/1993
(Continued)

OTHER PUBLICATIONS

International Search Report Issued Dec. 18, 2012 in PCT/JP12/076306 Filed Oct. 11, 2012.
(Continued)

*Primary Examiner* — Patrick Maines
(74) *Attorney, Agent, or Firm* — Oblon, McClelland, Maier & Neustadt, L.L.P.

(57) ABSTRACT

An exhaust gas purification device for purifying exhaust gas flowing through an exhaust gas channel of an engine includes fins installed in the exhaust gas channel to guide the exhaust gas to generate a swirling flow; and an injection device configured to inject a reducing agent to the swirling flow of the exhaust gas. The fins are expanded and opened toward a downstream side of an injection direction of the reducing agent so as to surround an injection region of the reducing agent.

9 Claims, 4 Drawing Sheets

(51) Int. Cl.
- *F01N 3/28* (2006.01)
- *B01F 5/00* (2006.01)
- *B01F 5/04* (2006.01)
- *B01F 3/04* (2006.01)
- *F01N 3/10* (2006.01)
- *F01N 3/021* (2006.01)
- *F01N 13/00* (2010.01)

(52) U.S. Cl.
CPC ......... *F01N 2470/18* (2013.01); *F01N 2610/02* (2013.01); *Y02T 10/24* (2013.01)

(56) References Cited

U.S. PATENT DOCUMENTS

| | | | | |
|---|---|---|---|---|
| 2006/0275192 | A1* | 12/2006 | Gabrielsson et al. | 423/235 |
| 2007/0274877 | A1* | 11/2007 | Bush et al. | 422/176 |
| 2010/0107618 | A1* | 5/2010 | Kimura | 60/324 |
| 2011/0094206 | A1* | 4/2011 | Liu et al. | 60/274 |
| 2011/0308234 | A1* | 12/2011 | De Rudder et al. | 60/295 |
| 2013/0164183 | A1* | 6/2013 | Iijima et al. | 422/170 |

FOREIGN PATENT DOCUMENTS

| | | |
|---|---|---|
| EP | 1 953 359 A1 | 8/2008 |
| JP | 51-45334 | 4/1976 |
| JP | 2008 208726 | 9/2008 |
| JP | 2009 150338 | 7/2009 |
| WO | 2006 010922 | 2/2006 |
| WO | 2011/108273 A1 | 9/2011 |

OTHER PUBLICATIONS

International Preliminary Report on Patentability and Written Opinion issued Jul. 10, 2014, in International Application No. PCT/JP2012/076306 (English translation).

Chinese Office Action issued in Application No. 201280065017.4 on Oct. 28, 2015.

European Search Report issued in Application No. 12861278.5 on Sep. 10, 2015.

* cited by examiner (a)

(b)

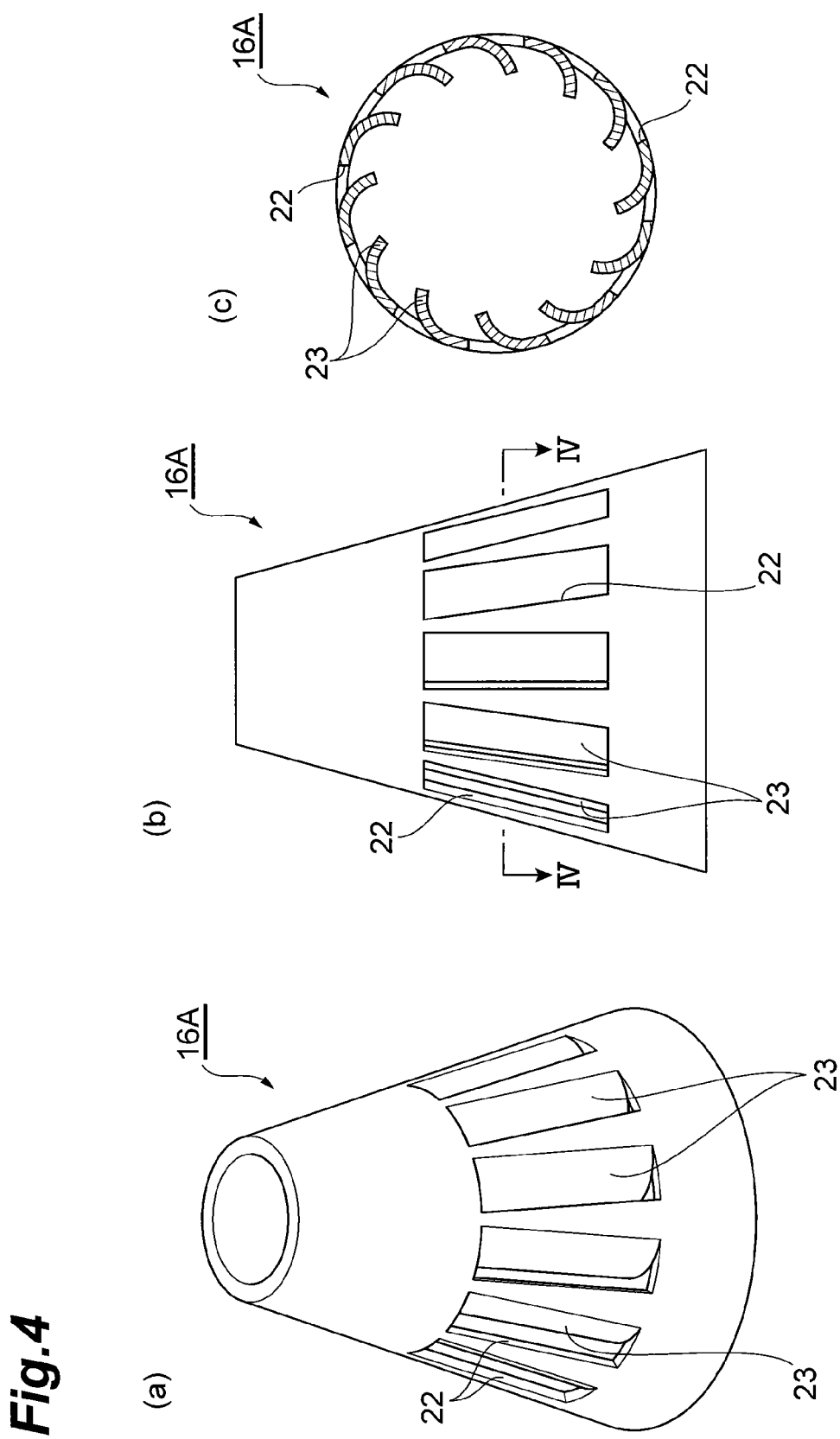

EXHAUST GAS PURIFICATION DEVICE

TECHNICAL FIELD

The present invention relates to an exhaust gas purification device.

BACKGROUND ART

In the related art, for example, an exhaust gas purification device disclosed in Patent Literature 1 has been known as an exhaust gas purification device for purifying exhaust gas flowing through an exhaust gas channel. The exhaust gas purification device disclosed in Patent Literature 1 includes an injection nozzle (injection device) for injecting urea water (reducing agent) to the exhaust gas, and reduces and purifies $NO_x$ in the exhaust gas by using ammonia generated by the injection of the urea water.

CITATION LIST

Patent Literature

Japanese Patent Laid-Open Publication No. 2009-150338

SUMMARY OF INVENTION

Technical Problem

Herein, the aforementioned exhaust gas purification device promotes diffusion of a reducing agent in order to obtain a satisfactory reductive reaction, so that by a fin, exhaust gas may be guided, and a swirling flow may be generated in the exhaust gas. However, in this case, there is a concern that the reducing agent is attached to the fin or on an inner wall surface of an exhaust gas channel due to flowing of the exhaust gas so that the diffusion of the reducing agent is not sufficiently performed. In particular, when the flow of the exhaust gas is low, the swirling flow is weak, thereby increasing the concern that reducing agent is attached.

An aspect of the present invention has been conceived in consideration of the above fact, and is to provide an exhaust gas purification device for sufficiently performing the diffusion of the reducing agent.

Solution to Problem

In order to solve the above-mentioned problem, an exhaust gas purification device corresponds to an exhaust gas purification device for purifying exhaust gas flowing through an exhaust gas channel of an engine, and includes fins installed in the exhaust gas channel to guide the exhaust gas to generate a swirling flow; and an injection device configured to inject a reducing agent to the swirling flow of the exhaust gas, wherein the fins are expanded and opened toward a downstream side of an injection direction of the reducing agent so as to surround an injection region of the reducing agent.

In this exhaust gas purification device, the reducing agent can be diffused by generating a swirling flow in the exhaust gas by the fins. Further, since the exhaust gas is restrained from directly entering the injection region of the reducing agent by the fins, the injected reducing agent is prevented from being attached to the fins or an inner wall surface of the exhaust gas channel after being carried away toward the flowing of the exhaust gas. Thus, the diffusion of the reducing agent can be sufficiently performed.

Further, the exhaust gas channel may have a cylindrical wall portion including the injection region, inlets through which the exhaust gas is introduced to an inside of the wall portion may be installed in the wall portion, and the fins may be formed in the inlets while extending to an inside of the wall portion.

At this time, a plurality of inlets may be installed, and the fins may be installed in the plurality of inlets, respectively.

Further, the fins may be configured to have a sectional surface, curved toward the injection region when viewed from the injection direction of the reducing agent, and a degree of curvature of said sectional surface decreases as the corresponding section surface goes toward a downstream side of the injection direction of the reducing agent.

Advantageous Effects of Invention

In accordance with the present invention, diffusion of a reducing agent can be sufficiently performed.

BRIEF DESCRIPTION OF DRAWINGS

FIG. 4A is a perspective view illustrating a modified example of a fin in the exhaust gas purification device of FIG. 1, FIG. 4B is a front view illustrating the modified example of the fin in the exhaust gas purification device of FIG. 1, and FIG. 4C is a sectional view taken along arrow line IV-IV of FIG. 4B.

DESCRIPTION OF EMBODIMENTS

Figure 1:
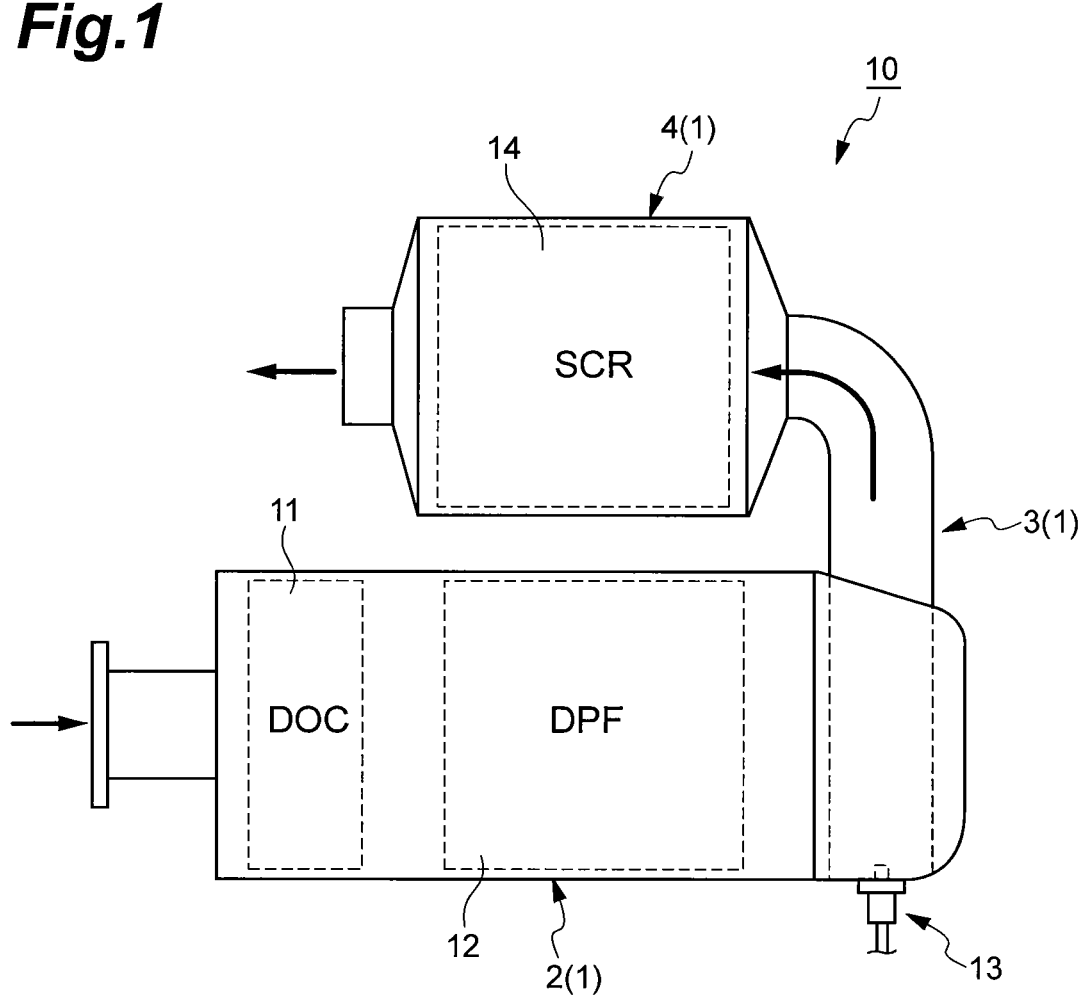
FIG. 1 schematically illustrates a configuration of an exhaust gas purification device according to an embodiment.

Hereinafter, a suitable embodiment of the present invention will be described in detail with reference to the drawings. Meanwhile, in the following description, the same components or equivalent components will be designated by the same reference numerals, and a duplicate description will be omitted.

FIG. 1 schematically illustrates a configuration of an exhaust gas purification device according to an embodiment. As illustrated in FIG. 1, an exhaust gas purification device 10 according to an embodiment corresponds to, for example, a device for purifying exhaust gas exhausted from engines such as a diesel engine, etc. in vehicles such as a truck, etc. (hereinafter, simply referred to as "exhaust gas"). The exhaust gas purification device 10 is mounted to an exhaust gas channel 1 through which the exhaust gas flows, and includes a Diesel Oxidation Catalyst (DOC) 11, a Diesel Particulate Filter (DPF) 12, an injection device 13 and a Selective Catalytic Reduction (SCR) 14.

The exhaust gas channel 1 is at least partitioned by a first casing 2, a pipe (wall portion) 3 and a second casing 4. The first casing 2, the pipe 3 and the second casing 4 are arranged in the exhaust gas channel 1 in order from an upstream side to a downstream side. The first casing 2 and the second casing 4 are juxtaposed such that flows of the exhaust gases therein are approximately parallel to each other. The pipe 3 connects a downstream side of the first casing 2 and an upstream side of the second casing 4 with each other. The pipe 3 straightly extends in a direction approximately perpendicular to a lengthwise direction of the first casing 2 and then extends to be bent toward the upstream side of the second casing 4.

The DOC 11 oxidizes unburned fuel in the exhaust gas, and is arranged at an upstream side within the first casing 2. The DPF 12 collects particulates (particle-shaped material) within the exhaust gas which has flowed through the DOC 11, and is arranged at a downstream side of the DOC 11 within the first casing 2.

The injection device 13 injects and adds the reducing agent to the exhaust gas immediately after passing through the DPF 12. The injection device 13 herein generates a thermal decomposition reaction and a hydrolysis reaction expressed in Equation (1) by injecting urea water as the reducing agent and generates ammonia.

$$(NH_2)_2CO \rightarrow NH_3 + HNCO \text{ (thermal decomposition reaction)}$$

$$HNCO + H_2O \rightarrow NH_3 + CO_2 \text{ (hydrolysis reaction)} \tag{1}$$

The SCR 14 selectively reduces $NO_x$ in the exhaust gas by using the added reducing agent and purifies the exhaust gas. The SCR 14 is installed within the second casing 4. The SCR 14 herein generates a reductive reaction expressed in Equation (2) by using the generated ammonia, and selectively reduces and purifies $NO_x$. Further, an ammonia reduction catalyst (not illustrated) for oxidizing surplus ammonia is installed at a rear stage of the second casing 4.

$$4NO + 4NH_3 + O_2 4N_2 + 6H_2O \text{ (Standard)}$$

$$6NO_2 + 8NH_3 \rightarrow 7N_2 + 12H_2O \text{ (Slow)}$$

$$NO + NO_2 + 2NH_3 \rightarrow 2N_2 + 3H_2O \text{ (Fast)} \tag{2}$$

Figure 2:
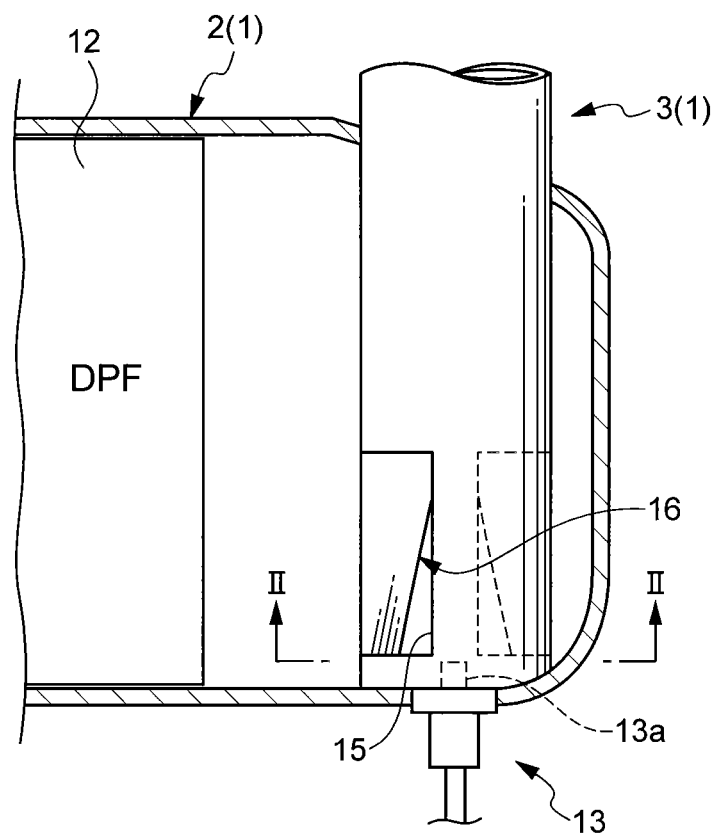
FIG. 2A is an enlarged view illustrating a main portion of the exhaust gas purification device of FIG. 1.
FIG. 2B is a perspective view illustrating the main portion of the exhaust gas purification device of FIG. 1 when viewed along arrow line II-II of FIG. 2A.
Figure 2:
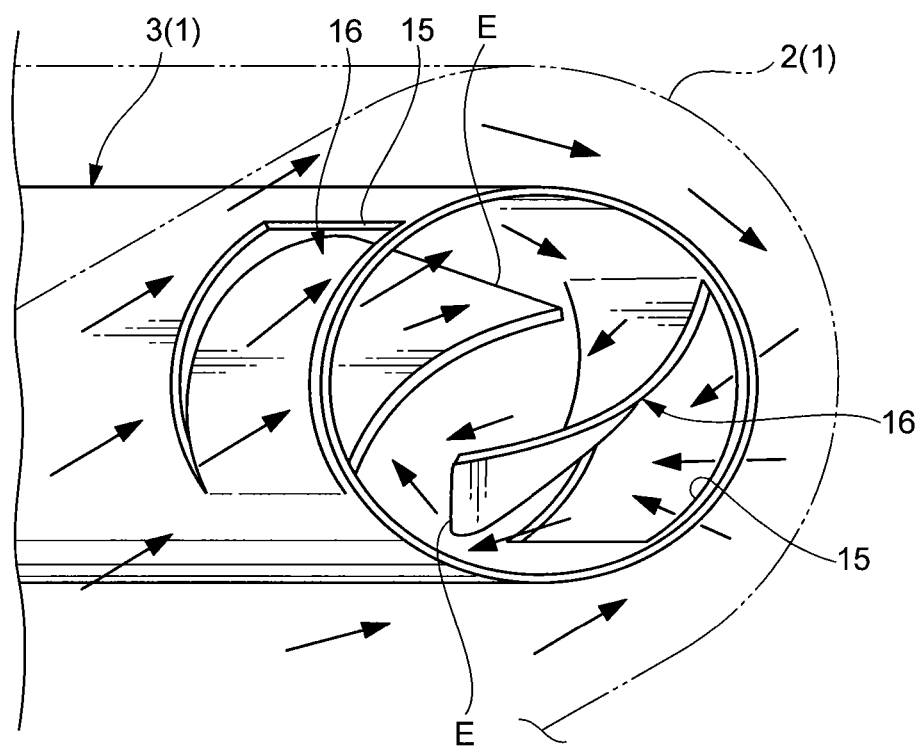

Next, a main portion of the aforementioned exhaust gas purification device 10 will be described in detail with respect to FIGS. 2 and 3.

FIG. 2A is an enlarged view illustrating a main portion of the exhaust gas purification device of FIG. 1. FIG. 2B is a perspective view illustrating the main portion of the exhaust gas purification device when viewed along arrow line II-II of FIG. 2A. FIG. 3 is a schematic view for describing the exhaust gas purification device of FIG. 1. As illustrated in FIGS. 2A, 2B and 3, an upstream side of the pipe 3 is inserted into a downstream side of the DPF 12 in the first casing 2. The upstream side of the pipe 3 extends such that the flow of the exhaust gas is approximately perpendicular to the first casing 2. Further, an opening end of the upstream side of the pipe 3 is closed by a wall surface of the first casing 2.

The injection device 13 is mounted to an end portion at the upstream side of the pipe 3 so as to inject the reducing agent along the extending direction of the corresponding pipe 3. The injection device 13 injects the reducing agent into the pipe 3. In other words, the pipe 3 includes an injection region A of the reducing agent injected from the injection device 13. A nozzle 13a of the injection device 13 herein is located on a central axis of the pipe 3, and injects the reducing agent from the central axial position of the pipe 3 toward the downstream side of the pipe 3.

An inlet 15 for introducing the exhaust gas to the inside is installed at an upstream side of an outer peripheral surface of the pipe 3. The inlet 15 corresponds to a rectangular through-hole passing between the inside and the outside of the pipe 3. A pair of inlets 15 are formed at a DPF 12 side and at a side opposite to the DPF 12 on the outer peripheral surface of the pipe 3 to face each other.

Herein, as illustrated in FIG. 2B, the exhaust gas purification device 10 according to an embodiment includes fins 16 as a mixer structure for mixing the reducing agent with the exhaust gas and vaporizing the reducing agent. The fins 16 correspond to guide plates for guiding the exhaust gas to generate a swirling flow. The fins 16 are mounted to the inlets 15, respectively, while extending to an inside of the pipe 3. In detail, each of the fins 16 has a curved-plate shape which is smoothly curved, and curvedly extends such that a base end side thereof is connected to the inlet 15 and the shape extends to an inside of the pipe 3 as the shape goes toward a distal end side, at the same time.

Further, the fins 16 are expanded and opened toward the downstream side of the injection direction (axial direction of the pipe 3) of the reducing agent so as to surround the injection region A of the reducing agent. In other words, the fins 16 are 3-dimensionally curved to surround the injection region A from the outside of the corresponding injection region A. In detail, each of the fins 16 is configured to have a sectional surface, curved toward the injection region A when viewed from the injection direction of the injection device 13, of which the degree of curvature decreases as the corresponding sectional surface goes toward a downstream side of the injection direction. That is, a leading end edge E at one end of the circumferential direction of each of the fins 16 is smoothly and outwardly spread within the pipe 3 as each of fins 16 goes toward the downstream side of the injection direction.

Meanwhile, the injection region A has a silhouette with an approximate conical shape in which the injection device 13 is a vertex. The injection region A can be geographically sought based on an injection angle at which the reducing agent is injected from the injection device 13, etc.

In the above-configured exhaust gas purification device 10, as illustrated in FIG. 1, firstly, the exhaust gas from the engine is oxidized by the DOC 11 within the first casing 2, and the particulates in the exhaust gas are then collected by the DPF 12. Further, as illustrated in FIG. 3, the exhaust gas is introduced into the pipe 3 via the inlet 15 immediately after passing through the DPF 12, and flows to be approximately perpendicularly bent by the pipe 3.

Figure 3:
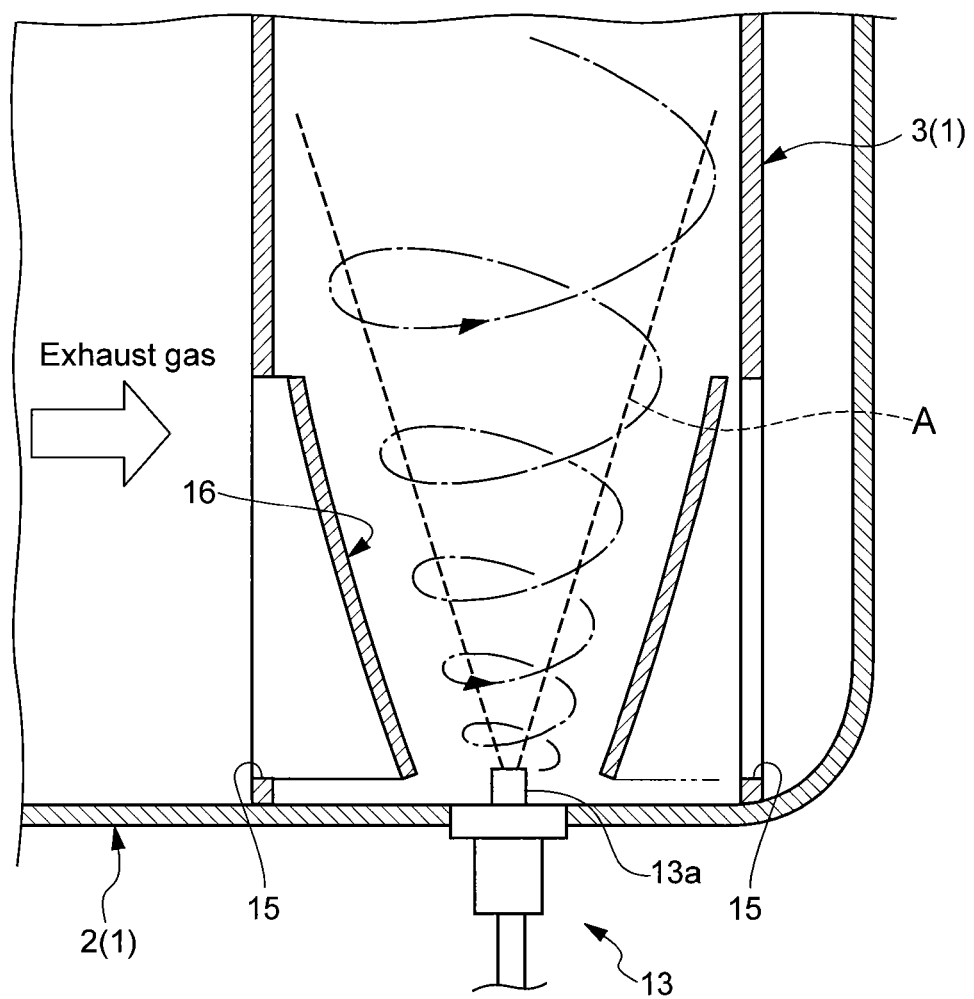
FIG. 3 is a schematic view for describing the exhaust gas purification device of FIG. 1.

As illustrated in FIGS. 2B and 3, the flow of the exhaust gas introduced from the inlet 15 is guided by the fins 16, and the exhaust gas flows so as to be wound about the central axis of the pipe 3 from the tangential direction. Accordingly, a swirling flow is generated around the central axis within the pipe 3. Further, the reducing agent is injected and added from the injection device 13 to the swirling flow of the exhaust gas, and ammonia is generated by the thermal decomposition reaction and the hydrolysis reaction.

At this time, as described above, since the fins 16 are expanded and opened so as to surround the injection region A, the exhaust gas is restrained from directly entering the injection region A, and the injected reducing agent is restrained from being carried away toward the flowing of the exhaust gas. As a result, the shape of the injection region A of the injected reducing agent is favorably maintained, and the injected reducing agent is mixed with the exhaust gas while being atomized (micronized) well enough not to be attached to the fins 16 or an inner wall surface of the pipe 3.

Thereafter, as illustrated in FIG. 1, the exhaust gas including ammonia is introduced to the second casing 4, and $NO_x$ in the exhaust gas is selectively reduced and purified by the SCR 14. Further, the exhaust gas is supplied to the ammonia reduction catalyst of a rear stage.

As described above, in accordance with the present embodiment, the reducing agent can be diffused by generating the swirling flow in the exhaust gas by the fins 16, and the exhaust gas is restrained from directly entering the exhaust region A, by the fins 16. Accordingly, the reducing agent is prevented from being attached to the fins 16 or the inner wall surface of the pipe 3 after being carried away toward the flowing of the exhaust gas. Thus, in accordance with the present embodiment, the diffusion of the reducing agent can be sufficiently performed.

Further, in the present embodiment, as described above, the exhaust gas channel 1 has a cylindrical shape including the injection region A, and the fins 16 are formed while extending to an inside of the pipe 3 at the inlet 15 of the corresponding pipe 3. Accordingly, the reducing agent can be restrained from being carried away toward the flowing of the exhaust gas, by the pipe 3. As a result, the reducing agent can be further prevented from being attached to the fins 16 or the inner wall surface of the pipe 3, and the diffusion of the reducing agent can be further sufficiently performed.

That is, it is preferred that the exhaust gas channel has the cylindrical wall portion including the injection region, the inlet for making the exhaust gas introduced to the inside is installed in the wall portion, and the fins are formed in the inlets while extending to the inside of the wall portion. In this case, the reducing agent can be prevented from being carried away toward the flowing of the exhaust gas, even by the wall portion. As a result, the reducing agent can be further prevented from being attached to the fins or an inner wall surface of the exhaust gas channel, and the diffusion of the reducing agent can be further sufficiently performed.

Further, in the present embodiment, as described above, since the plurality of inlets 15 having the fins 16 are installed in the pipe 3, a pressure (exhaust pressure) of the exhaust gas can be reduced. That is, it is preferred that the plurality of inlets are installed and the fins are installed in the plurality of inlets, respectively. In this case, the pressure of the exhaust gas can be suitably reduced. Further, in the present embodiment, since the reducing agent is prevented from being attached with respect to the fins 16 or the inner wall surface of the pipe 3 as described above, the corresponding fins 16 or the corresponding pipe 3 can be prevented from being corroded by the reducing agent.

Although embodiments according to an aspect of the present invention have been described above, the present invention is not limited to the embodiments, and may be changed or may be applied to other fields, without changing the subject matter defined in each of the claims.

For example, in the aforementioned embodiment, an aspect of the present invention is applied to the exhaust gas purification device 10 for injecting the reducing agent into the pipe 3 while the reducing agent flows to be perpendicularly bent in the exhaust gas channel 1. However, the aspect of the present invention is not limited thereto, and may be applied to, for example, an exhaust gas purification device for injecting the reducing agent in a sloped direction with respect to the flowing of the exhaust gas channel 1.

Although the fins 16 are installed in the inlets 15 of the pipe 3 in the aforementioned embodiment, the present invention is not limited thereto, and the fins 16 may be installed within the exhaust gas channel 1 so as to surround the injection region A. Further, although two inlets 15 are installed in the pipe 3 in the aforementioned embodiment, one inlet 15 may be installed or three or more inlets 15 may be installed. Likewise, one fin 16 may be installed, or three or more fins 16 may be installed.

Although the truck is exemplified as a vehicle in the aforementioned embodiment, the vehicle may be, for example, a bus, a tractor, or other vehicles. Meanwhile, in the above, the word "approximately" means that an error in manufacturing or designing is allowed.

The shape of the fins according to the aspect of the present invention is not limited to the aforementioned embodiment, and may be expanded and opened toward the downstream side of the injection direction of the reducing agent so as to surround the injection region A. For example, fins 16A exemplified in FIG. 4 may be provided instead of the fins 16. The fins 16A have a conical tubular shape surrounding the injection region A. A plurality of openings 22 such as slits, etc. and a plurality of guide wings 23 installed in the openings 22 to be inwardly bent are formed on a peripheral surface of the fins 16A, as components for generating swirling flow.

Meanwhile, although the fins 16A have the conical shape in an example of FIG. 4, the fins 16A may have a truncated cone shape, a polygonal pyramidal shape, a truncated polygonal pyramidal shape, a combination thereof, or a part thereof. Further, the shape of the openings 22 is not limited to an illustrated example, and may have a shape extending in a helical shape around an axis of the fin 16A. Further, the guide wings 23 may not be installed.

INDUSTRIAL APPLICABILITY

In accordance with an aspect of the present invention, the diffusion of the reducing agent can be sufficiently performed.

| Reference Signs List | |
|---|---|
| 1: Exhaust gas channel | 3: Pipe (wall portion) |
| 10: Exhaust gas purification device | |
| 13: Injection device | 15: Inlet |
| 16, 16A: Fin | A: Injection region |

The invention claimed is:

1. An exhaust gas purification device for purifying exhaust gas flowing through an exhaust gas channel of an engine, the exhaust gas purification device comprising:
    fins installed in a cylindrical wall portion of the exhaust gas channel to guide the exhaust gas to generate a swirling flow; and
    an injection device including a nozzle which injects a reducing agent to the swirling flow of the exhaust gas,
    wherein an injection region of the reducing agent presents a conical shape with the injection device as a vertex thereof,
    wherein the fins are expanded and opened from a first end closer to the injection device toward a second end in a downstream side of an injection direction of the reducing agent so as to surround the injection region of the reducing agent in the injection direction of the reducing agent, a distance between the fins at the first end in a direction parallel to a diameter of the cylindrical wall portion being less than a distance between the fins at the second end in the direction parallel to the diameter of the cylindrical wall portion,
    wherein an axis of the injection region and an axis of the cylindrical wall portion both are parallel with the injection direction of the reducing agent,
    wherein a gap exists between the injection region and the fins along an entire length of the fins in a region where the fins surround the injection region, and
    wherein the fins lie entirely outside of the injection region.

2. The exhaust gas purification device according to claim 1, wherein the cylindrical wall portion bounds the injection region,
    inlets through which the exhaust gas is introduced to an inside of the cylindrical wall portion are formed at the cylindrical wall portion, and the fins are formed in the inlets while extending to the inside of the cylindrical wall portion.

3. The exhaust gas purification device according to claim 2, wherein a plurality of inlets are formed, and the fins are formed in the plurality of inlets, respectively.

4. The exhaust gas purification device according to claim 1, wherein each of the fins has a sectional surface curved toward the injection region when viewed from the injection direction of the reducing agent, and a degree of curvature of said sectional surface decreases as said sectional surface goes toward the downstream side of the injection direction of the reducing agent.

5. The exhaust gas purification device according to claim 2, wherein each of the fins has a sectional surface curved toward the injection region when viewed from the injection direction of the reducing agent, and a degree of curvature of said sectional surface decreases as said sectional surface goes toward the downstream side of the injection direction of the reducing agent.

6. The exhaust gas purification device according to claim 3, wherein each of the fins has a sectional surface curved toward the injection region when viewed from the injection direction of the reducing agent, and a degree of curvature of said sectional surface decreases as said sectional surface goes toward the downstream side of the injection direction of the reducing agent.

7. The exhaust gas purification device according to claim 1, further comprising a first casing including a particulate filter, wherein an upstream end of the cylindrical wall portion is inserted into a downstream side of the particulate filter in the first casing, a direction of the exhaust gas flowing in the first casing being perpendicular to a direction of the exhaust gas flowing in the cylindrical wall portion.

8. The exhaust gas purification device according to claim 7, further comprising a second casing including a selective catalytic reduction catalyst, wherein a downstream end of the cylindrical wall portion is in fluid communication an upstream side of the selective catalytic reduction catalyst in the second casing, a direction of exhaust flowing in the second casing being perpendicular to the direction of the exhaust gas flowing in the cylindrical wall portion and being parallel to the direction of the exhaust gas flowing in the first casing.

9. The exhaust gas purification device according to claim 7, further comprising an oxidation catalyst disposed upstream of the particulate filter.

\* \* \* \* \*